Nov. 11, 1930.  A. BERMAN  1,780,903
AUTOMOBILE VENTILATOR
Filed Jan. 30, 1930  2 Sheets-Sheet 1
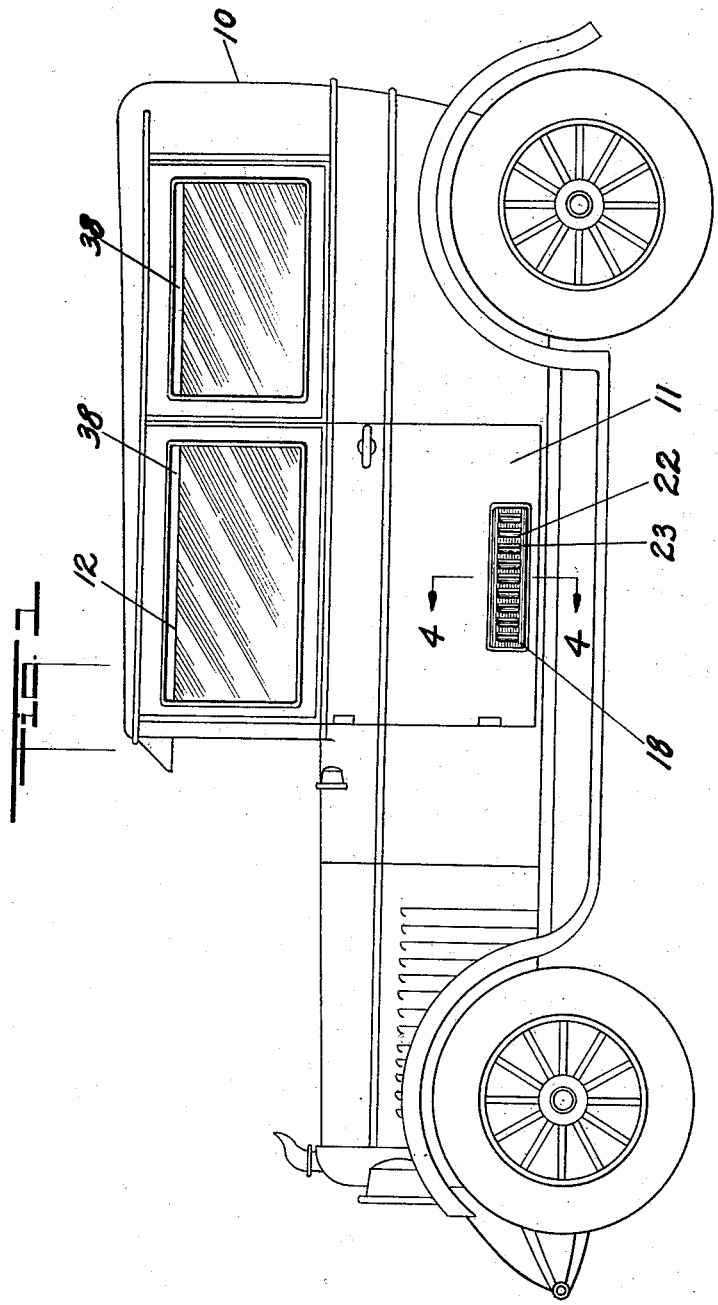
INVENTOR
ADOLPH BERMAN
BY Joseph Blacker
ATTORNEY

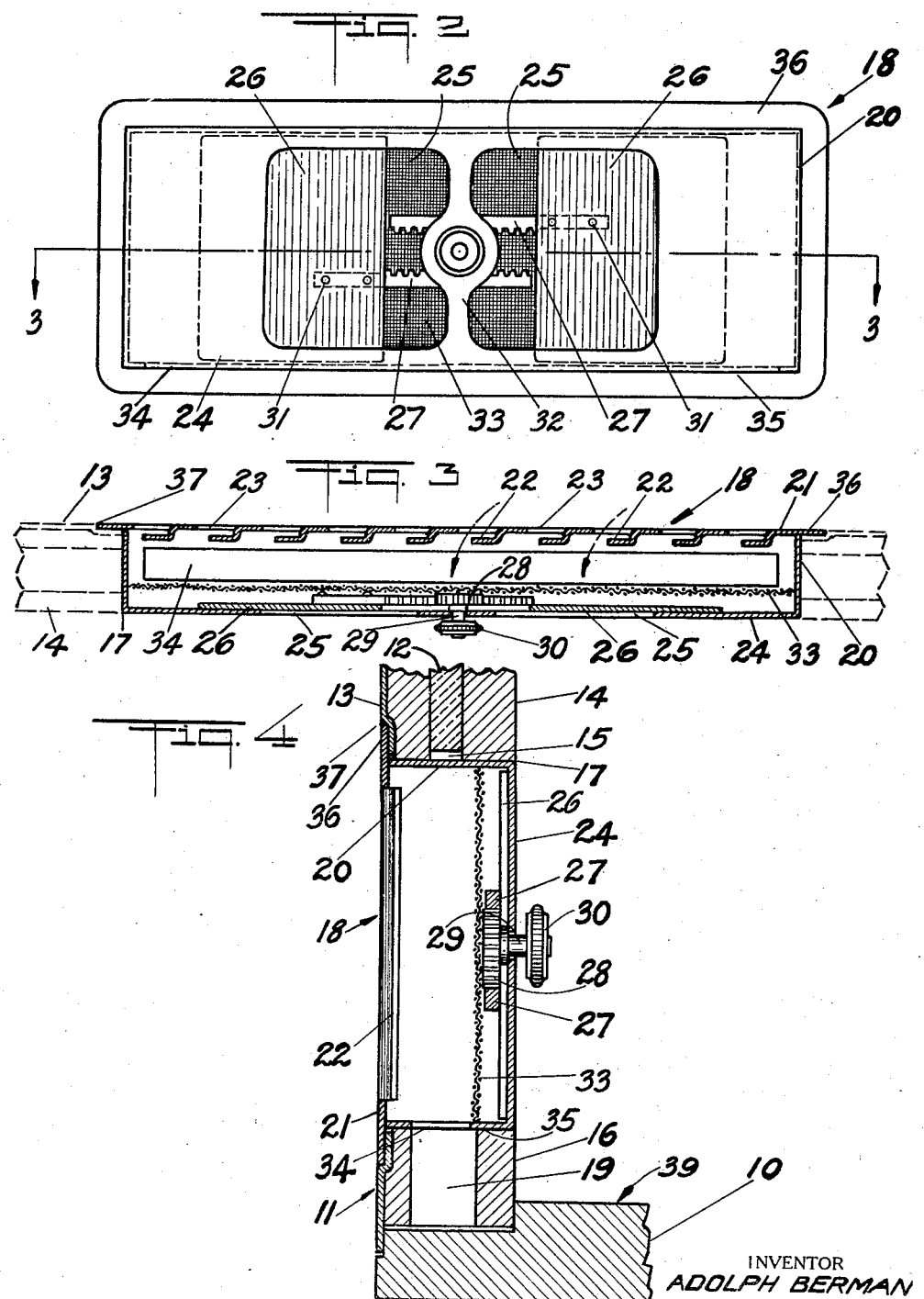

Patented Nov. 11, 1930

1,780,903

UNITED STATES PATENT OFFICE

ADOLPH BERMAN, OF JACKSON HEIGHTS, LONG ISLAND CITY, NEW YORK

AUTOMOBILE VENTILATOR

Application filed January 30, 1930. Serial No. 424,710.

The present invention relates to improvements in ventilators for automobiles and particularly to a ventilator which may be installed as a unit at the lower level of the side doors.

Another object of this invention is to provide means for regulating the volume of air admitted through the ventilator into the vehicle body.

Another object of this invention resides in the provision of a fine mesh screen placed in the ventilator to keep out dust, insects, etc., and a downwardly facing aperture in the door frame through which the undesirable substances drop to the ground when the door is opened.

With the above and other objects in view the invention will be hereinafter more particularly described and the combination and arrangement of parts will be shown in the accompanying drawings and pointed out in the claims which form part of this specification, it being understood that the embodiment herewith shown is merely illustrative and that various changes in the form, proportion, size and minor details of construction within the scope of the claims, may be resorted to without departing from the spirit or sacrificing any of the advantages of the invention.

Reference will now be had to the drawings, wherein like numerals of reference designate corresponding parts throughout the several views, in which:

Figure 1 is a side elevation of an automobile showing a front view of the ventilator as installed in one of the doors.

Figure 2 is a rear view of the ventilator and shows two sliding doors therein for regulating the volume of air admitted into the vehicle through the ventilator.

Figure 3 is a horizontal sectional view of the ventilator taken as on line 3—3 in Figure 2.

Figure 4 is an enlarged vertical sectional view of the ventilator and door taken as on line 4—4 in Figure 1.

In the illustrated embodiment of the invention, Figure 1 shows a vehicle body 10, a side door 11 equipped with a vertically slidable panel of plate glass 12 which may be raised and lowered between the outer partition 13 and inner partition 14 of the door, best shown in Figure 3 and Figure 4, by means of a lifting device operated from the interior of the vehicle. When the glass panel is lowered all the way down, there is a vacant space 15 left between the bottom of the glass and the lower side 16 of the door 11.

A through opening 17 is provided in the door 11 at the floor level of the vehicle body and the ventilator 18 is inserted therein from the outside of the vehicle. A downwardly facing aperture 19 is also provided in the lower side 16 of the door 11.

The ventilator 18 comprises a unit assembly and consists of a rectangular light metal frame 20, the overall depth of which is the same as the depth of the door in which the ventilator is to be installed and the length and height correspond to the dimensions of the opening 17 in the door. The frame 20 is provided with a front wall 21 in which there is stamped or formed a plurality of louvers 22, 22, extending substantially the full height of the ventilator and arranged in parallel relation with each other. The openings 23, 23, formed by the louvers face in the same direction and the louvers curve towards the interior of the ventilator. The rear or inner wall 24 of the ventilator has been perforated to provide two apertures 25, 25. Adjacent the rear wall 24 and interiorly of the ventilator there has been provided two horizontally sliding doors 26, 26, which are manipulated by means of two racks 27, 27, and a pinion gear 28. The pinion gear is mounted at one end of a shaft 29 at the other end of which is an operating member 30 which may have a knurled surface so as to be easily gripped. The racks 27, 27 are suitably fastened to the doors by means of rivets or countersunk screws 31, or may be welded in place and the pinion gear is rotatably mounted in a central rib 32, forming part of the rear wall 24. As best shown in Figure 2, the gear and racks are normally in mesh and each rack projects from its respective door in the direction of the opposite door.

It will thus be noted that when the member 30 is rotated the gear 28 engages the teeth in both racks 27, 27, and both doors may be either separated or brought closer together simultaneously.

Between the space between the louvers 22 and the sliding doors 26, 26, there is mounted a fine mesh screen partition 33 preferably extending parallel to the side walls. The screen is permanently fastened in place.

A through aperture 34 is provided in one of the longer sides 35 of the rectangular frame 20 and when the ventilator is installed in the opening 17 of the side door 11, the aperture 34 is superimposed over the corresponding aperture 19 in the lower side of the door of the vehicle.

As best shown in Figure 3, the front wall 21 of the ventilator is larger than the frame 20 or the rear wall 24 and forms a projecting flange 36 all around the frame. The outer partition 13 of the door 11 has an inwardly protruding recess 37 all around the opening 17 and this recess admits the front wall 21 of the ventilator so that when the ventilator is installed in place the front wall of the ventilator aligns with the front face of the door and there are no projecting parts at the front face of the vehicle door. The rear or inner wall of the ventilator is made to align with the inner face of the vehicle door and the front and rear ventilator walls are parallel.

The ventilators are designed to be removably installed in the side doors or other portions of the vehicle body, and are intended to be produced as a complete unit assembly in varied sizes, the general arrangement of the parts, however, remaining the same.

Other uses may be found for the ventilator, such as for installation in windows of buildings where it is desirable to have a ventilator having means for regulating the volume of air admitted into the room while the ventilator remains permanently fixed in the window frame.

*Operation of invention*

When the vehicle is set in motion in a forward direction, the air rushing by the vehicle body is scooped into the vehicle through the ventilator louvers 22 at the floor level 39 of the vehicle, and the vitiated air is forced out through an opening 38 at the upper level of the glass panel 12 which is kept slightly lowered.

The screen partition 33 serves to prevent dust and insects from entering the interior of the vehicle. The dust and insects are thrown against the screen and fall down through the aperture 34 in the frame into the downwardly facing aperture 19 in the door. When the vehicle door is opened, the foreign substances fall down to the ground.

The passenger or the operator manipulates the sliding doors 26, 26, of the ventilator by rotating the operating member 30 and regulates the air draft admitted through the louvers according to the requirements and conditions of the weather.

The air admitted through the louvers 22, 22, is discharged between the sliding doors 26, 26, in the manner indicated by arrows in Figure 3; the volume of air admitted being controlled by operating the ventilator doors by means of which the air supply may be shut off entirely without disturbing the vehicle door, or vehicle body, etc.

A ventilator of my improved construction is comparatively simple and compact, can be easily and cheaply produced and installed, is applicable for use in connection with all forms of vehicles and is effective in regulating the volume and condition of the air entering the vehicle and in keeping the passengers' feet cool during hot weather, and does not interfere with the raising and lowering of the glass panel in the door.

Having thus described my invention, what I claim as new and desire to secure by Letters Patent is:

1. A ventilator for vehicles, comprising a frame having front and rear walls, the front wall being larger than the rear wall and forming a projecting flange all around said frame, the front wall being provided with a plurality of louvers facing inwardly, the rear wall being provided with apertures and with sliding doors within the ventilator frame to open and close said apertures, a screen partition intermediate the said walls, and an aperture in one of the sides of the frame.

2. In combination, a ventilator unit assembly removably installed as a unit in a through aperture of a vehicle door, and comprising a frame having front and rear walls, a plurality of louvers in the front wall, a plurality of apertures in the rear wall, a plurality of doors inwardly of said rear wall and adapted to open and close said apertures, a screen partition intermediate the front and rear walls of the ventilator and an aperture in the lower side of the frame, said aperture being superimposed over a co-acting through aperture in the lower side of the vehicle door.

3. A ventilator for vehicles, comprising a frame having parallel front and rear walls, the front wall being provided with a plurality of louvers facing inwardly, the rear wall being provided with one or more apertures and with regulating means within the ventilator frame to open and close said apertures, the said ventilator being provided with a screen partition intermediate the said walls, and an aperture in one of the sides of the frame.

4. An adjustable ventilator unit for a vehicle removably installed at the lower level of a door of said vehicle and comprising a hollow rectangular frame having parallel front and rear walls, the front wall being larger than the frame and forming a flange all around said frame, the front wall being provided with a plurality of louvers facing inwardly of said frame, the rear wall being provided with apertures and with two horizontally slidable doors within the ventilator frame and adjacent said wall, a screen partition intermediate the front and rear ventilator walls, a pinion gear mounted in the rear wall to engage racks on the sliding doors and adapted to open or close said doors simultaneously, the front and rear walls of the ventilator being respectively in alignment with the outer and inner faces of the vehicle door and a through slot in the lower sides of the ventilator and vehicle door, said slot being located intermediate the louvered front wall and screen partition.

Signed at the city of New York, in the county of New York and State of New York, this 13th day of December A. D. 1929.

ADOLPH BERMAN.